United States Patent
Fujikami et al.

(10) Patent No.: US 7,594,159 B2
(45) Date of Patent: Sep. 22, 2009

(54) SIGNATURE FIELD IN A LATENCY MEASUREMENT FRAME

(75) Inventors: Craig Glenn Fujikami, Honolulu, HI (US); William Thomas Hatley, San Jose, CA (US); Jocelyn Tamie Kunimitsu, Honolulu, HI (US); Jon Kanji Otaguro, Honolulu, HI (US); Carl Masami Uyehara, Kaneohe, HI (US)

(73) Assignee: Spirent Communications Inc., Calabasas, CA (US)

( * ) Notice: Subject to any disclaimer, the term of this patent is extended or adjusted under 35 U.S.C. 154(b) by 1144 days.

(21) Appl. No.: 10/974,214

(22) Filed: Oct. 26, 2004

(65) Prior Publication Data
US 2006/0088060 A1    Apr. 27, 2006

(51) Int. Cl.
*H03M 13/00* (2006.01)
*H03M 13/51* (2006.01)

(52) U.S. Cl. .................... 714/776; 714/807
(58) Field of Classification Search ............... None
See application file for complete search history.

(56) References Cited

U.S. PATENT DOCUMENTS

| 6,449,656 B1 * | 9/2002 | Elzur et al. | 709/236 |
| 6,826,197 B1 * | 11/2004 | Goode et al. | 370/466 |
| 7,080,308 B2 * | 7/2006 | Schroeder | 714/758 |

* cited by examiner

*Primary Examiner*—Christine T Tu
(74) *Attorney, Agent, or Firm*—Anthony T. Cascio (57) ABSTRACT

Information is added to an encapsulated payload in a data field of a frame subsequently to placing a checksum into a checksum field of a header encapsulating the payload, wherein the checksum has been determined from byte values of the header and the payload, yet having the checksum remaining detectable as valid upon interpretation of the header and the payload. A signature field that contains the information is inserted into the data field. The signature field has a checksum cheater subfield. A one's complement of a checksum determined from byte values of the information is then placed into the checksum cheater subfield. Accordingly, the checksum in the checksum field of the header remains valid.

20 Claims, 2 Drawing Sheets

SIGNATURE FIELD IN A LATENCY MEASUREMENT FRAME

BACKGROUND OF THE INVENTION

1. Field of the Invention

The present invention is directed generally to apparatus and methods for modifying a data field of a frame subsequently to generation of frame headers and more particularly to an improved signature field in which such modification occurs that provides for optimization of frame generation and emission rates in a transmitting instrument and transmission rates through networks.

2. Description of the Related Art

In the monitoring, testing and maintenance of packet switched networks, it is necessary to measure accurately one or more measures of network latency, for example, the time it takes for a packet to traverse the network from its source to its destination. To measure this traversal time, various apparatus and methods have been developed in the prior art that share a basic concept of placing timestamp information into one or more packets to be emitted into the network by a transmitting instrument and extracting such timestamp information from the timestamp-containing packet at a receiving instrument. Instruments that implement this basic concept can obtain various latency measurements of the network and also of associated devices under test within the network.

Typically, timestamp information is obtained from a local clock or counter in the transmitting instrument and written into the packet prior to its emission into the network. When the packet is received at the receiving instrument, timestamp information within the packet can be read and such information compared to received time information obtained from a local clock or counter in the receiving instrument. The difference between the received time information and the timestamp information conceptually reflects a static measure of the network latency between these two instruments or network endpoints at a particular point in time.

However, since many networks, and especially the Internet, are continually carrying at any particular point in time packets for an indeterminate level of communication traffic, network latency measurements accordingly require timestamp-containing packets to be emitted into the network continuously over a period of time, with the current timestamp information written into each packet. Moreover, the rate of emission of the timestamp containing packets into the network in many test procedures for obtaining latency measurements ideally should be as high as possible. Accordingly, network latency data can be developed that has the broadest coverage and meaning in real time network traffic environments.

In addition to timestamp containing packets sent from one endpoint to another, the timestamp containing packets can be emitted from and received at multiple endpoints, and at any of these endpoints any instrument can act as both a transmitting and receiving instrument for itself or for other instruments at other endpoints, such that the acquired latency data may provide a more complete dynamic overview of the network. For example, multiple point-to-point traversal and round trip transit times, latency through a specific node or device under test within the network, and other such parameters, and time variant changes thereto, can be obtained. Various types of test instruments for these endpoint devices are known in the prior art.

One requirement to ensure accuracy of the network latency measurement is that the clock or counter in the transmitting instrument must be synchronized with the corresponding clock or counter in the receiving instrument such that the difference between the time information derived from each instrument provides valid data. It is possible to synchronize the clocks or counters of two endpoint connected devices by operating them in lockstep or by first obtaining a known offset between them. In a network wherein the endpoints for the latency measurement are geographically diverse or wherein multiple endpoints are subject to the latency measurements, real time clocks in the endpoint devices may be synchronized using an accessible time service or network time protocol, as disclosed in Schulnan, U.S. Pat. No. 5,600,632.

Another requirement to ensure accuracy of the network latency measurement is that the timestamp information preferably be obtained concurrently with framing of the packet and as near as possible to the time the frame is emitted into the network. However, the functional specifications for the frame in which timestamp information is to be inserted, including the format and content of the various fields in the frame that are required for compatibility with the networking framework of the network for which latency measurements are being obtained, are generally not amenable to writing the timestamp information so obtained directly into the data field of the frame. As is known, the format and content of these fields are defined by known protocols, generally implemented as protocol layers of a hierarchical protocol stack, that any network connected device must be cognizant of to be able to interpret frames developed by any other network connected device cognizant of the same protocols.

One known technique to insert timestamp information directly into the frame upon its imminent emission into the network is to provide software or a hardware module in the transmitting instrument that is operative to append such information to the encapsulated payload within the data field of the frame as the bit stream of the frame is being emitted into the network concurrently with the calculation of the frame check sequence appended to the end of the frame. At the receiving instrument, the entire data field with the appended information is, however, interpreted as the payload of the encapsulated packet within the frame, which may result in the payload being discarded for reasons as set forth immediately below.

One of the above mentioned protocols provides that the header, which encapsulates this payload, contains a checksum calculated at the transmitting instrument from the byte values of this header and the payload prior to the timestamp information being appended thereto. At the receiving instrument, these byte values of the received header and payload, which now includes the byte values of the timestamp information, are read to compute a verifying checksum. For the received checksum to be valid, thereby signifying that no error occurred in the value of one or more bytes of the received header and payload during transmission through the network, the received checksum must match the verifying checksum. Thus, it can be clearly seen that should the timestamp information be appended as above described, the received checksum and verifying checksum would not match, resulting in the received packet being discarded. Should the timestamp information be added prior to computation of this checksum, the accuracy of the latency measurement is degraded due to the generally indeterminate time required for subsequent processing at lower protocol layers subsequent to the timestamp information being obtained and the emission of the frame into the network.

One solution to the forgoing problem is disclosed in Perches, U.S. Pat. No. 6,252,891 (the Perches reference). As described therein, timestamp information is written into the frame immediately prior to emission of the frame into the network in a protocol neutral manner such that the received checksum is always valid.

In accordance with the methods and apparatus disclosed in the Perches reference, an initial packet is generated in a conventional manner at a particular protocol layer wherein the initial packet includes a network protocol portion and a payload portion. The payload portion contains several predefined fields and predetermined data within all except four of these fields that are initially empty. The four empty fields, which may be collectively referred to as a signature field, are each of a predetermined or reserved byte count. The network protocol portion contains a checksum computed for the initial packet from the data contained in the payload portion and other header information in the network protocol portion. Clearly, the four empty fields do not contribute to the checksum.

The initial packet is then processed by a test instrument that adds both a signature sequence and a transmit signature timestamp of appropriate byte count to their respective, but heretofore empty, predefined fields within the signature field reserved in the payload portion. For each successive frame generated by the test instrument, the signature sequence number is incremented starting with the initial sequence number obtained from the initial packet and the transmit signature timestamp is obtained from a local clock in the packet generator. Otherwise, all other fields in the payload portion and network protocol portion, including the pre-computed checksum, remain unchanged in each successive frame.

In order for the pre-computed checksum as computed in the initial packet to remain unchanged and valid after inclusion of the signature sequence number and transmit signature timestamp that change in each successive frame, the test instrument also adds a one's complement bit-by-bit inverse of the signature sequence number and a one's complement bit-by-bit inverse of the transmit signature timestamp to their respective predefined fields in the signature field. Since the checksum of the signature sequence number and the transmit signature timestamp taken together with their respective inverses is zero, the pre-computed checksum in each successive packet accordingly remains valid irrespective of the insertion of the additional bytes into the signature field.

As taught in the Perches reference the total number of bytes for the one's complement inverse fields is equal to the number of bytes for the signature sequence number and the transmit signature timestamp fields to maintain neutrality of the prior computed checksum. In the particular embodiment disclosed therein, the number of bytes reserved for the signature sequence number is two bytes and the number of bytes reserved for the transmit signature timestamp is four bytes, resulting in the total length for the one's complement inverse fields being six bytes.

However, should it be desirous to increase the number of packets emitted to accommodate a sequence number greater than $2^{16}$ or to provide a greater resolution of the timestamp, the number of bytes for the respective one of these fields would need to be increased thereby requiring an equal number of bytes to be added to the corresponding one's complement inverse field. Furthermore, should any additional fields be desired in a test procedure, the number of bytes for each one of these additional fields necessarily requires the addition of an equal number of bytes for a corresponding one's complement inverse field. Since packet size and emission rates are inversely related, a need exists that obviates the necessity to include a one's complement inverse field of an equal number of bytes for each field added subsequent to calculation of the prior computer checksum so that emission rates are maintained as high as possible.

Instead of providing an initial packet with a pre-computed checksum as described in the Perches reference, it is also possible to simulate the processing of the payload and its encapsulating header for the packet at the protocol layer at which the checksum is computed, as is known in other test instruments. In such simulation, the payload and header still need to be read in order to compute the checksum prior to any information being written into the signature field. As the timestamp information and any other information is being written into the signature field, the entire frame is read so that a frame check sequence (FCS) can be appended to the frame as it is being emitted by the test instrument. Thus, the requirement that the encapsulated packet first be read to compute the checksum and then the frame be read in its entirety to compute the FCS may further lower the effective rate that such frames can be generated and emitted into the network.

In a packet generator wherein upper layer processing of the payload and encapsulating header is simulated, it would be highly desirable to be able to provide a valid checksum for the header concurrently with the frame being read during computation of the FCS to maximize the rate such frames are generated and emitted. Accordingly, another need exists that obviates the requirement to first read the encapsulated packet to compute the checksum.

After the test instrument emits the frames containing a signature field of the type disclosed in the Perches reference, the receiving test instrument must determine that the signature field is present and valid. Since the signature field has a known format and has been appended to the end of the predefined payload, the receiving instrument can generally presume the position of the signature field. To determine validity, a test may be performed to verify, for example, that the data in the presumed position of the signature sequence number and its inverse are indeed complements of each other, and possibly a further test performed to verify that the same condition is true for the transmit timestamp signature field and its inverse.

Although the signature field is appended as described above to the pre-existing payload, and thus at the end of the data field of the emitted frame, the signature field may not be at precisely the end of the data field when the frame is received at the receiving instrument. Various devices, including devices under test, within the network may remove and rewrite some of the header information in the frame, resulting in a lesser byte count preceding the data field. In order to maintain a minimum required length of the frame, any such device will move the remaining frame data up to fill that void and then pad the end of the frame to maintain the minimum length. For example, Ethernet devices within VLAN networks are an example of such a device under test. The result is that the signature sequence number and its complement and the transmit timestamp signature and its complement may or may not be at their presumed position within the received frame, and must therefore be searched for.

In a signature field that utilizes the sequence/sequence complement and the timestamp/timestamp complement, it can be shown that simply testing for these conditions as a means for identifying the location of the signature field, and thus the transmit timestamp signature and signature sequence number fields, can not be error free. Because of the randomness of the data in the packet, there is a certain probability that the packet bytes just prior to the signature field will be the complement of the signature field, in such a way that a test that assumes that the signature field begins with these packet bytes may indicate a valid sequence/sequence complement and timestamp/timestamp complement, even though that is a false location for the signature field.

Therefore, when network devices move the location of the signature field by a small number of bytes, it is no longer possible to determine at the receiving instrument without some non-zero probability of error exactly where the signature field is. In fact, the likelihood of error is very high if the test instrument emits a sufficient number of frames.

It is therefore highly desirable that the signature field can be accurately located after its position has been shifted by an indeterminate number of bytes. Accordingly, a need exists to provide a signature field in which test conditions are verifiable at a receiving instrument without false results or errors.

It may also be seen in the signature field described in the Perches reference that the data for either the signature sequence number and the transmit timestamp signature, and their respective inverses, may include identical bytes in successive frames. For example, the signature sequence number and its inverse are each described as having a width of two bytes. As the least significant byte of the signature sequence number is incremented for each successive frame, the next higher order byte, as well as its bit-by-bit inverse, will contain the same value for up to a maximum of two hundred fifty six frames. In a similar example for the transmit signature timestamp, and its inverse, it should be noted that the least significant bit may change by more than one in each successive frame resulting in fewer successive frames having higher order bytes for these fields remaining unchanged. However, as described in the Perches reference, the transmit signature timestamp and its inverse each have a length of four bytes so that a theoretical maximum of $2^{24}$ number of frames wherein the most significant byte remains unchanged could be emitted.

After the frame is emitted into the network, it may traverse a sub-network or link therein in which one or more impermissible byte values cannot appear therein. For example, in a synchronous optical network (SONET), high-level data link control (HDLC) frames, as defined in RFC 2175, each begin and end with a flag sequence represented as 0x7E. Accordingly, a byte value equal to the flag sequence may not appear anywhere within the frame itself After computation of the FCS for each frame, any occurrence of a byte value within the frame that is the same as the flag sequence value is converted to a new value of two bytes, represented as 0x7D x5E, using a process commonly referred to as byte stuffing. So that no confusion exists upon interpreting the frame upon receipt, a normal byte value of 0x7D occurring within the frame further needs to be stuffed such that a new value of two bytes, represented as 0x7D 0x5D, results. Upon receipt of the HDLC frame, the stuffed bytes are reconstructed to their original value prior to calculating the FCS for the received frame.

When testing networks, it is highly desirable that the minimum allowed size of the frame be used to maximize effective transmission rate of such frames through the network. In a SONET network, the minimum frame size allowed is forty bytes. Therefore, for each byte stuffed in the frame, the effective transmission rate of the frame through the network is reduced to 40/(40+N) of the normal line rate, wherein N is the number of bytes stuffed in each frame.

When a frame contains random data the occurrence of either 0x7D or 0x7E should also be sufficiently random such that the effective transmission rate through the SONET link should not be significantly degraded. However, as set forth above, when one or more byte values of successive frames remain unchanged over many frames, and further when the repeating byte values is subject to byte stuffing, the average transmission rate for all such frames through the network can be significantly lowered from the transmission rate obtainable from transmission of all minimum sized frames. The result is that the test instrument receiving a significant number of byte-stuffed frames is not able to establish a consistent line-rate test that would normally require minimum sized packets.

It is therefore highly desirable that the effects of byte stuffing be minimized. Accordingly, a need exists that randomizes byte values within frames that may otherwise potentially remain unchanged over many frames.

SUMMARY OF THE INVENTION

It is therefore an object of the present invention to provide a method and apparatus that obviates the requirement to write a bit-by-bit inverse data in an equal length to the signature sequence number and the transmit timestamp signature, while still providing a valid checksum, in order to increase the rate such frames can be generated and emitted.

It is a further object of the present invention to provide a method and apparatus that obviates the requirement to first read the encapsulated packet to compute the checksum.

It is another object of the present invention to provide a method and apparatus that uses a signature field in which test conditions are verifiable at a receiving instrument without false results or errors.

It is yet another object of the present invention to provide a method and apparatus that randomizes byte values within frames that may otherwise potentially remain unchanged over many frames.

According to the present invention, information can be added to an encapsulated payload in a data field of a frame subsequently to placing a checksum into a checksum field of a header that encapsulates the payload. Although the checksum has been determined from byte values of the header and the encapsulated payload prior to such information being added, the present invention provides that the checksum remains detectable as valid upon interpretation of the header and the payload subsequent to such information being added. In particular, a signature field that contains the information is inserted into the data field. The signature field further has a checksum cheater subfield. A one's complement of a checksum determined from byte values of the information contained in the signature field is then placed into the checksum cheater subfield. Since the overall checksum of the signature field inclusive of the one's complement byte value in the checksum cheater subfield is checksum neutral, the checksum in the checksum field of the header remains valid irrespective of the contents of the subsequent insertion of the signature field.

In an alternative embodiment of the present invention, which provides for the checksum in the checksum field of the header to be detectable as valid upon interpretation of the header and the payload a randomly generated checksum is placed in the checksum field during generation of the header. Subsequently, a signature field that contains the information and the checksum cheater field is inserted in the data field of the frame. A true checksum determined from byte values of the header inclusive of the checksum field, the payload and the information exclusive of the checksum cheater subfield is then placed into the checksum cheater subfield. As a result, the randomly generated checksum in the checksum field of the header is detectable as valid.

In a test instrument, which develops latency measurement frames, the above alternative embodiment of the invention advantageously allows such frames to be generated and processed "on the fly," that is as the frame itself is being emitted from the test instrument. A feature of this embodiment of the present invention is that as the test instrument is generating the transport layer header, it need only insert a random value into the checksum field advantageously obviating the need first to read the header and payload, thereby allowing the bit stream of this portion of the frame to be emitted simultaneously with its generation. The true checksum and CRC of the appropriate byte values being emitted need only be accumulated for inclusion in the checksum cheater subfield and the FCS field appended at the end of the frame. Accordingly, when the signature field includes timestamp information, such information can be obtained just as it is to be added bit wise to the bit stream of the frame being emitted, with the checksum and CRC being accumulated and subsequently added bit wise into their respective fields. A receiving instrument need not be cognizant of the checksum cheater subfield since the checksum in the transport layer header appears valid.

In another embodiment of the present invention, degradation of an effective transmission rate of packets in a network in which an impermissible byte value in a selected portion of any one of the packets is replaced by at least a pair of bytes can be minimized. A value of each of the bytes in the selected portion of each one of the packets is first randomized in a transmitting instrument. Each of the packets with the randomized value is then emitted from the transmitting instrument. The selected portion of the packets is then reconstructed upon receipt of the packets at a receiving instrument.

A feature of this embodiment of the present invention is that the randomization substantially advantageously eliminates the possibility impermissible byte values, such as would occur in a SONET network, from appearing in successive frames. Accordingly, any impermissible byte value that does occur within the randomized values is itself sufficiently random such that effective transmission rates through such networks are minimally and even insignificantly degraded.

In yet another embodiment of the present invention, a predefined formatted field in a received packet can be readily located. The predefined formatted field includes a first portion and a second portion and the second portion contains byte values developed as a function of byte values contained in the first portion. A location of the predefined formatted field is first assumed such that a presumed location of each of the first portion and the second portion are defined from the assumed location. A test value is developed as the same function of the byte values contained in the presumed location of the first and the second portion. The test value is then compared to a predetermined value. An equality of the test value to the predetermined value is indicative of the predefined formatted field being at the assumed location.

The forgoing embodiment of the present invention is particular advantageous in locating at a receiving instrument the predefined formatted field in a VLAN frame. When a device in the VLAN network strips a VLAN tag from the MAC header, the frame is padded to return it to its required length. A feature of this embodiment of the present invention is that the byte values from two portions within the assumed location of the field are tested as set forth above. The testing advantageously eliminates the false positive that may occur when one or more bytes are compared to an equal number of bytes to determine of the byte values are one's complement inverses of each other.

These and other objects, advantages and features of the present invention will become readily apparent to those skilled in the art from a study of the following Description of the Exemplary Preferred Embodiments when read in conjunction with the attached Drawing and appended Claims.

DESCRIPTION OF THE EXEMPLARY PREFERRED EMBODIMENTS

Figure 1:
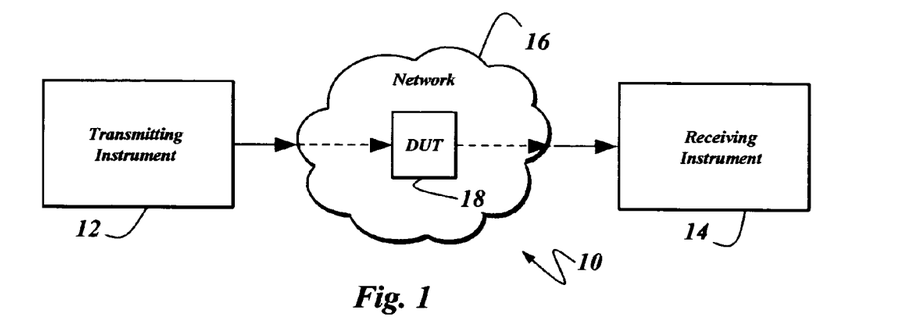
FIG. 1 is a schematic diagram of a system in which apparatus constructed according to the principles present invention may be used.

Referring now to FIG. 1, there is shown a system 10 including a transmitting instrument 12, a receiving instrument 14 and a network 16. The transmitting instrument 12 may be any conventional device in which packets are developed and framed for emission into the network 16. Similarly, the receiving instrument 14 may also be a conventional device that receives such packets emitted into the network 16 by the transmitting instrument 12. The network 16 may also include one or more devices under test (DUT), such as DUT 18.

As instruments adapted and enabled for the testing of the network 16, the immediately above described functionality of the transmitting instrument 12 and the receiving instrument 14 may be embodied in separate test instruments or may be embodied in a single test instrument. The network 16 may be any one or combination of public or private local or wide area networks, the Internet, and any of their subnetworks.

Figure 2A:
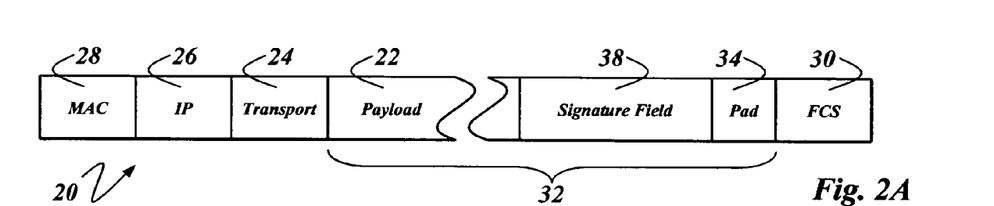
FIG. 2A is a fragmentary view of a bit stream of a frame developed by the transmitting instrument of FIG. 1.

With further reference to FIG. 2A, there is shown a fragmentary view of a bit stream of a frame 20 as emitted by the transmitting instrument 12 into the network 16. The frame 20, as is conventionally known, frames a datagram that includes a packet having a payload 22 encapsulated by a transport layer header 24 and further includes an internet protocol (IP) header 26. To frame the datagram, the frame 20 conventionally includes a data link layer or media access control (MAC) header 28 and a frame check sequence (FCS) field 30.

As best seen in FIG. 2A, the payload 22 is within a data field 32 of the frame 20. The data field 32 may also include a pad 34 appended thereto. The pad 34, as is known, may at any time be empty or contain one or more bytes such that either of the frame 20 or data field 32 has the minimum required length required by the protocols which the transmitting instrument 12 any device within the network 16 are cognizant of.

Figure 2B:
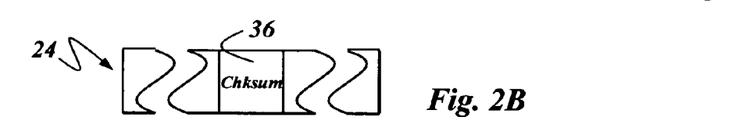
FIG. 2B is a detail of the transport layer header of FIG. 2A.

As best seen in FIG. 2B, the transport layer header 24 includes a checksum field 36. As is well known, the checksum field 36 contains a checksum that is normally computed from the byte values of the payload 22 and the transport layer header 24 (exclusive of the checksum field 36) during processing of the packet at the transport layer of a protocol stack in the transmitting instrument 12. It is to be noted that the transmitting instrument 12, as a test instrument, may simulate such processing at the transport layer to develop the transport layer header 24 or insert an initialized packet having a pre-computed checksum into the bit stream of the frame 20, similarly as described in the Perches reference. Also, as described below, computation of a checksum during real or simulated transport layer processing, or even a single computation of a pre-computed checksum for an initial packet, is obviated in accordance with one embodiment of the present invention in which a random checksum may be written into the checksum field 36.

As is known in test instruments, the transmitting instrument 12 is further operative to add information to the data field 32 of the frame 20 subsequent to the payload 22 and the transport layer header 24 being developed. More specifically, the transmitting instrument 12 is operative to insert a signature field 38, as best seen in FIG. 2A, into the data field 32, wherein the signature field 38 contains such information as hereinbelow described.

Exemplarily, such information may include timestamp information obtained upon imminent transmission of the frame 20. Accordingly, the signature field 38 is preferably inserted into the data field 32 as the bit stream of the frame 20 is being emitted from the transmitting instrument 12. For example, as the bit stream of the frame 20 is being emitted, concurrently with calculation a value of the a frame check sequence, the signature field 38 may be inserted into the data field, and then the value of the frame check sequence is appended to the frame 20 as the FCS field 30.

As best seen in FIG. 2A, the signature field 38 is preferably appended to the payload 22 so that the signature field is inserted at the end of the data field 32. In such case, as the bit stream of the frame 20 is being emitted, upon completion of the emission of the payload 22, the signature field is then appended bit-wise to the payload 22 as the emission of the signature field 38 in the bit stream of the frame 20 continues.

Although the signature field 38 is preferably appended to the payload 22, it may be prepended to the payload 22 or appear within the payload 22. Also, as stated above, the signature field 38 may not always be at the end of the data field 32 when any pad 34 has been added to the data field 32 by any device in the network 16. It will be seen from the below described details of the signature field 38 that, irrespective of any pad 38 being added, the signature field 38 may be accurately located within the data field 32 upon receipt at the receiving instrument 14.

Upon receipt of the frame 20 by the receiving instrument 14, conventional processing verifies the FCS value in the FCS field 30 and strips the MAC header 28, the IP header 26 and any pad 34 from the frame 20 so that the packet can be processed at the transport layer of a protocol stack in the receiving instrument 14 to be interpreted. Generally, the checksum in the checksum field 36 must be determined to be valid at the receiving instrument 14 so that the packet can be interpreted and not discarded.

Except for the hereinbelow described embodiment that writes a random checksum into the checksum field 36, the checksum as determined at the transmitting instrument 12 and written into the checksum field 36 was computed from the byte values of the transport layer header 24 and payload 22. However, during processing at the transport protocol layer in the receiving instrument 14 the entire data field 32 (subsequently to any pad 34 being stripped therefrom) of the received frame 20 is interpreted as the payload encapsulated by the transport layer header 24. Accordingly, computation of the verifying checksum occurs using all received bytes of the received payload 22, signature field 38 and transport layer header 24 (exclusive of the checksum field 36).

As noted above, the received checksum in the checksum field 36 to be valid must match the verifying checksum. However, since the signature field 38 has not yet been appended to the payload 22 at the time the checksum is written into the checksum field 36, the byte values of the information subsequently written into the signature field cannot cause the checksum in the checksum field 36 not to match the verifying checksum, which is computed using the byte values of the information in the signature field 38. Described hereinbelow, are two methods to ensure validity of the checksum in the checksum field 36 upon interpretation of the received packet at the receiving instrument 14.

Figure 3A:
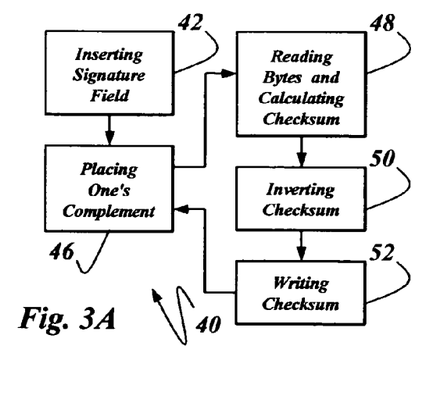
FIG. 3A is a flowchart of a first method to add information to the payload of FIG. 2A subsequent to the generation of the transport layer header of FIG. 2A.

With further reference to FIG. 3A, there is shown a flowchart 40 of a first method to ensure validity of the checksum in the checksum field 36. Prior to practicing the first method, a checksum from the byte values of the payload 22 and IP header 24 (exclusive of the checksum field 36) is determined in a conventional manner, irrespective whether actual or simulated processing is performed to compute the checksum or an initial packet having a pre-computed checksum is used as described in the Perches reference.

Figure 2C:
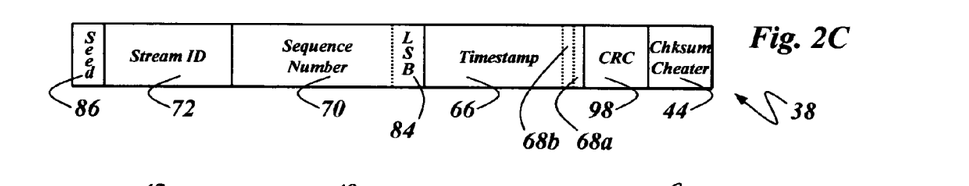
FIG. 2C is a detail of the signature field of FIG. 2A.

In accordance with the method of the flowchart 40, the signature field 38, which contains the desired information, is inserted into the data field 32, as indicated at step 42. As best seen in FIG. 2C, the signature field 28 has a checksum cheater subfield 44. Further in accordance with the method of the flowchart 40, a one's complement of a checksum determined from byte values of the information contained in the signature field 38, exclusive of the checksum cheater subfield 44, is placed into the checksum cheater subfield 44, as indicated at step 46.

As set forth above, the checksum in the checksum field 36 is a valid checksum of the byte values of the payload 22 and transport layer header 24. When a verifying checksum is conventionally computed using the byte values of the payload 22, the transport layer header 24 and the signature field 38 inclusive of the checksum cheater subfield 44, such as would occur at the receiving instrument 14 as above described, the contribution to the verifying checksum of the signature field 38 inclusive of the checksum cheater subfield 44 would be zero because the checksum of the signature field 38 exclusive of the checksum cheater subfield 44 when summed with its one's complement in the checksum cheater subfield 44 results in a zero value. Accordingly, the checksum in the checksum field 36 remains valid to determine if any transmission errors to the transport layer header 24, payload 22 or signature field 38 have occurred.

In order to place the one's complement in the checksum cheater subfield 44, as indicated at step 46, the byte values of the signature field 38, exclusive of the checksum cheater subfield 44, are read, as indicated at step 48, and as being read, the checksum of these byte values is calculated. The calculated checksum from these byte values is then inverted, as indicated at step 50, into the one's complement, and the one's complement written, as indicated at step 52, into the checksum cheater subfield 44.

It can be seen that, irrespective of whether actual or simulated processing of the payload 22 and transport layer header 24 is performed, the byte values of the payload 22 and transport layer header 24 must first be read so that the checksum to be written into the checksum field 36 can be determined. Subsequently, as the frame 20 is being emitted, the byte values of the entire frame 20 need to be read to compute the value of the frame check sequence to be appended into the FCS field 30. Thus, the byte values of at least the payload 22 and transport layer header 24 are read twice for the frame 20 to be emitted from the transmitting instrument 12 into the network 16.

A below described second method to ensure validity of the checksum in the checksum field 36 obviates the need to first read any byte values to determine the checksum in the checksum field 36. It will become apparent that this second method is particularly useful when the payload 22 and transport layer header 24 are simulated such that their respective byte values, including those of the checksum field 36, can be inserted into the frame 20 as the frame 20 is being emitted, thereby enhancing the rate that the frames can be emitted.

Figure 3B:
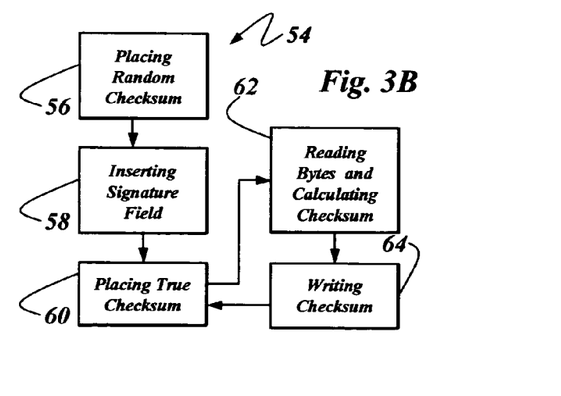
FIG. 3B is a flowchart of a second method to add information to the payload of FIG. 2A subsequent to the generation of the transport layer header of FIG. 2A.

With further reference to FIG. 3B, there is shown a flowchart 54 the second method to ensure validity of the checksum in the checksum field 36. In contrast to the first method described above, no prior processing relating to determination of a checksum is required.

In accordance with the method of the flowchart 54, when the transport layer header 24 is generated, a randomly generated checksum is placed in the checksum field 36, as indicated at step 56. The signature field 38, which contains the desired information, is inserted into the data field 32, as indicated at step 58. Similarly as described above, the signature field 38 includes the checksum cheater subfield 44. Further in accordance with the method of flowchart 54, a true checksum is determined from the byte values of the payload 22, the transport layer header 24 inclusive of the checksum field 36, and the signature field 38 exclusive of the checksum cheater subfield 44, as indicated at step 60.

When a verifying checksum is conventionally computed using the byte values of the payload 22, the transport layer header 24 exclusive of the checksum field 36 and the signature field 38 inclusive of the checksum cheater subfield 44, such as would occur at the receiving instrument 14 as above described, the verifying checksum would be equal to the randomly generated checksum in the checksum field 36. It is apparent to those skilled in the art that, as performed in a checksum calculation, the exclusive-or sum of the byte values of the header 24 inclusive of the checksum field 36, payload 22 and signature field 38 exclusive of the cheater subfield 44 is equal to the exclusive-or sum of the byte values of the header 24 exclusive of the checksum field 36, payload 22 and signature field 38 inclusive of the cheater subfield 44. Accordingly, the checksum in the checksum field 36, although randomly generated, is valid to determine if any transmission errors to the payload 22, transport layer header 24, or signature field 38 have occurred.

In order to place the true checksum in the checksum cheater subfield 44, as indicated at step 60, the byte values of the transport layer header 24 inclusive of the checksum field 36, the payload 22 and the signature field 38 exclusive of the checksum cheater subfield 44 are read, as indicated at step 62, and as being read, the checksum of these byte values is calculated. The calculated checksum from these byte values is then written, as indicated at step 64, into the checksum cheater subfield 44.

It can be seen that the randomly generated checksum in the checksum field 44 obviates the need to first read the byte values of the payload 22 and transport layer header 24 so that the checksum to be written into the checksum field 36 can be determined. The transport layer header 24, as it is generated with the randomly generated checksum in the checksum field 36, followed by the payload 22, as it is generated, may each be concurrently added to the bit stream of the frame 20 as it is being emitted from the transmitting instrument 12. As the frame 20 is being emitted, the byte values of the entire frame 20 need to be read only once to compute simultaneously the true checksum placed in the checksum cheater subfield 44 and the value of the frame check sequence to be appended into the FCS field 30. Therefore, the rate that the frames, such as frame 20, can be emitted from the transmitting instrument 12 into the network 16 is enhanced over other such methods in which byte values need to be read twice in separate determinations of the checksum and frame check sequence.

The signature field 38, when inserted into the data field 32 concurrently with the bit stream of the frame 20 being emitted as described above, is particularly useful to place timestamp information, contemporaneously obtained from local clock or counter (not shown) in the transmitting instrument 12 as is well known in the art, into each emitted frame 20. Accordingly, the signature field 38 may further include a timestamp subfield 66, as best seen in FIG. 2C, which may contain such timestamp information. The timestamp subfield 66, when used with the checksum cheater subfield 44, allows for timestamp information to be inserted into the frame 20 as the frame 20 is being emitted from the transmitting instrument 12. In particular, timestamp information can be inserted subsequently to the emission of the header 24 and the payload 22 so that timestamp information is obtained as close as possible to the FCS field 30 being appended to the frame 20.

The timestamp subfield 66 may have a number of bytes commensurate with the bit width of the local clock or counter from which the timestamp information is obtained. For example, a width of five bytes for the timestamp subfield 66 may be sufficient to provide timestamp information of sufficient resolution in a number of successive frames 20 to conduct latency measurements. Furthermore, one or more bits, such as the two least significant bits 68a, 68b, of the timestamp subfield 66 may be status bits interpretable at the receiving instrument 14, for example, to select one of several different modes of processing the received timestamp information.

Typically, the timestamp information in each emitted frame 20 is accompanied by sequence number information such that when the received packet is processed at the receiving instrument 14, the timestamp information contained in the timestamp subfield 66 can be correlated with the order that such packets were generated. In this regard, the sequence number information can provide unambiguous determination at the receiving instrument 14 of dropped or out-of sequence packets. Accordingly, the signature field 38 may further include a sequence number subfield 70, which may contain such sequence number information.

The sequence number subfield 70 may have a number of bytes sufficient to provide an incrementing sequence number for the expected number of timestamp containing frames 20 to be emitted by the transmitting instrument 12. For example, a width of five bytes for the sequence number subfield 70 provides for a total number of 240 frames 20 that may be emitted before the sequence number "rolls over."

It may also be useful to provide stream identifier information to be used in conjunction with either or both of the timestamp information in the timestamp subfield 66 or the sequence number information in the sequence number subfield 70. Accordingly, the signature field 38 may further include a stream ID subfield 72, which may contain such stream identifier information.

The stream ID subfield 72 may, in one example, have a width of four bytes. The stream identifier information in the stream ID subfield 72 may be used to correlate or index aggregated statistics developed in the receiving instrument 14.

Figure 4:
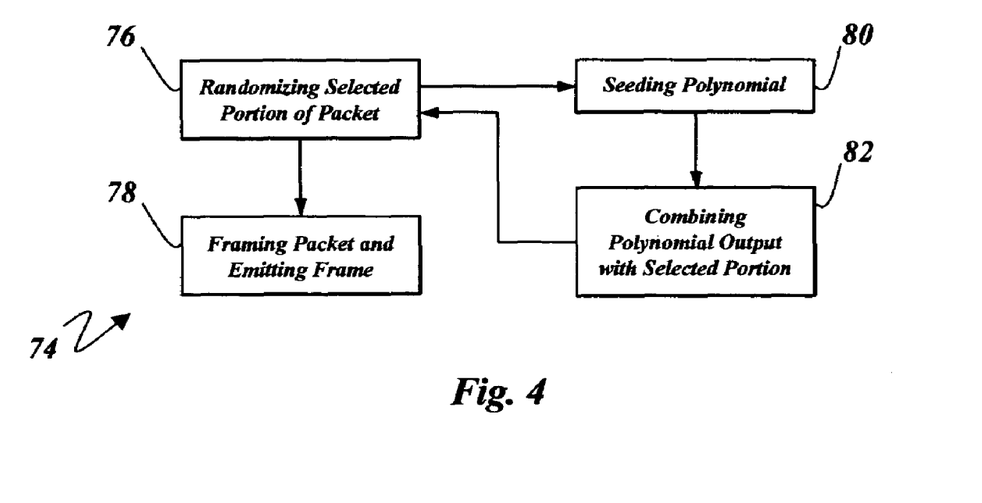
FIG. 4 is a methods practiced in accordance with the principles of the present invention.

Referring now to FIG. 4, there is shown a flowchart 74 of a method to minimize degradation of the transmission rates through the network 16 in the event each packet contained in a succession of frames 20 contains any byte values that are impermissible within such network 16, wherein such impermissible byte values are stuffed, as described above.

In accordance with the method of the flowchart 74, a value of each of the bytes in a selected portion of each one of the packets is randomized in the transmitting instrument 12, as indicated at step 76. Each of the packets with the randomized value is then framed in a respective one of the succession of frames 20 and emitted from the transmitting instrument 12 into the network 16, as indicated at step 78. Upon receipt of the each of the packets at the receiving instrument 14, the selected portion of the packets is reconstructed, i.e., each byte returned to its original value before randomization, prior to the packet being interpreted.

In a preferred embodiment of the randomizing step 76, a preselected polynomial is seeded with a seed value to obtain a polynomial output value, as indicated at step 80. The polynomial output value is then combined, using a logic function, with the value of each of the bytes in the selected portion of the packet, as indicated at step 82, to obtain the randomized value of each of the bytes therein. The logic function may exemplarily be an exclusive-OR (EX-OR) function. Furthermore, the seed value may be derived from a value of one of the bytes in the selected portion of the packet.

An exemplary polynomial may be $x^8+x^6+x^5+x^1+x^0$, which is irreducible. Beginning with the seed value, the polynomial may then preferably be executed a number of times equal to the number of bytes to be randomized in the selected portion of the packet such that an identical number of byte-wide polynomial output values are obtained. Each of these polynomial output values may then be EX-OR'ed with each respective one of the bytes in the selected portion of the packet to be randomized.

When each of the packets includes at least the timestamp subfield 66 and the sequence number subfield 70 of the signature field 38, either or both of these subfields are likely to contain impermissible bytes for certain networks, as described above, in a significant number of packets or in packets of successive frames 20. Accordingly, the selected portion of the packet that is randomized should include the timestamp subfield 66 and the sequence number subfield 70. When the signature field 38 further includes the stream ID subfield 72, the selected portion of the packets should also further include the stream ID subfield 72. The randomization of these byte values assures that the packets in the successive frames 20 most likely do not contain these impermissible byte values, and if any occurrence of these impermissible values does occur after randomization, the occurrence of such impermissible byte values would be sufficiently random such that when byte stuffing does occur the overall transmission rates are still kept to a maximum and not degraded.

In a preferred embodiment of the present invention, the seed value is a one's complement of a least significant byte 84 of the sequence number subfield 70. Since the seed value must be used at the receiving instrument 14 to reconstruct the randomized bytes, the signature field 38 may further include a seed subfield 86 that contains the seed value. The polynomial used at the transmitting instrument 12 is also used at the receiving instrument 14 to reconstruct the randomized bytes.

The seed subfield 86 may exemplarily appear as the first byte of the signature field 38, as best seen in FIG. 2C. Since the seed value is preferably the complement of the value in the least significant byte 84 of the sequence number subfield 70, the seed subfield 86 may also be useful to facilitate location of the signature field 38 in a received packet at the receiving instrument 14.

As stated above, when the packet is received at the receiving instrument 12, the location of a predefined formatted field therein, such as the signature field 38, must be located. Although the signature field 38 is preferably appended to the payload 22 and has a known length, its initial byte would be readily locatable. However, in the event the signature field 38 is placed at the end of a sixty-four byte VLAN frame, and such frame passes through the DUT 18 that strips the VLAN tag from the frame, in particular from the MAC header 28 as is known, the frame is then padded using the pad 34 to return the VALN frame to sixty-four bytes. In such event, any pad 34 that has been added to the VLAN frame would cause the location of this initial byte of the signature field 38 to be shifted.

Figure 5:
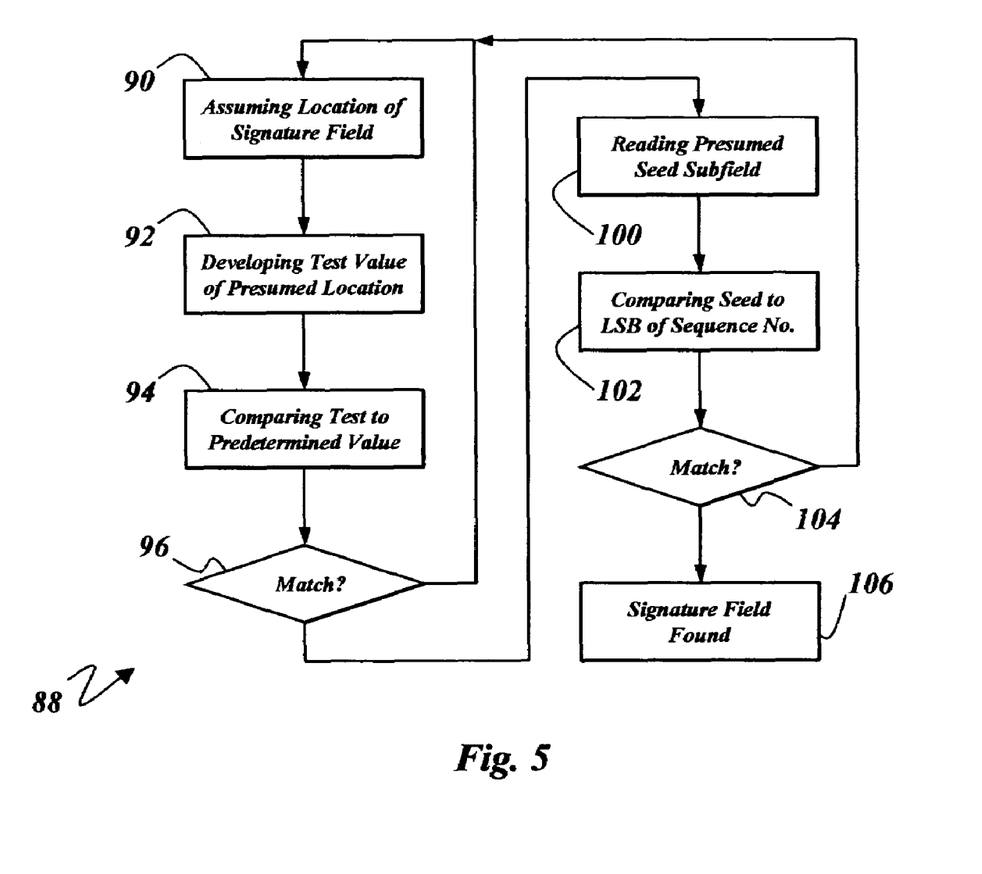

Referring now to FIG. 5, there is shown a flowchart 88 of a method to locate a predefined formatted field, such as the signature field 38, in a received packet wherein the predefined formatted field includes a first portion and a second portion and further wherein the second portion contains byte values developed as a function of byte values contained in the first portion.

In accordance with the method of the flowchart 88, a location of the predefined formatted field is assumed, as indicated at step 90, such that a presumed location of each of the first portion and the second portion are defined from the assumed location. A test value is then developed as the same function from the byte values contained in the presumed location of both of the first portion and the second portion, as indicated at step 92. The test value is then compared to a predetermined value, as indicated at step 94. A decision is made, as indicated at step 96, whether an equality of the test value to the predetermined value exists.

If such equality exists, as indicated by the YES path, there is an indication of the predefined formatted field being at the assumed location. Otherwise, if there is no such equality, the NO path is taken and the assuming step 90, developing step 92 and the comparing step 94 are reiterated at a different assumed location of the predefined formatted field until such equality is obtained. For example, the next assumed location may be the next immediately more significant byte location from an immediately prior iteration. If, after testing all possible locations in the data field 32 during successive reiterations, equality between the test value and the predetermined value is not obtained, the packet is rejected.

In one embodiment of the present invention, the second portion is an error detection subfield of the predefined formatted field. Accordingly, the function referred to above is an error detection function. Although in practicing the method of the flowchart 88 any predefined formatted field and error detection function may be used, for purposes of the present disclosure such predefined formatted field may be the signature field 38 and the error detection function may be a cyclical redundancy check function. In such case, the error detection subfield is a cyclical redundancy check (CRC) subfield 98 of the signature field 38 containing a cyclical redundancy check value of the byte values contained in the above described first portion. The first portion itself includes at least the timestamp subfield 66, and preferably may further include the sequence number subfield 70 as well as the stream ID subfield 72 and the seed subfield 86.

In the preferred implementation of the signature field 38, the value in the CRC subfield 98 is computed over all of the bytes of the seed subfield 86, the stream ID subfield 72, the sequence number subfield 70 and the timestamp subfield 66. The CCITT CRC polynomial, $x^6+x^{12}+x^5+1$, also being irreducible is preferably used.

The CRC value in the CRC subfield 98 is initialized to all ones, and the byte values in the subfields of the signature field 38 used to compute the CRC are consumed in big-endian fashion. Once the CRC value is computed over all of the bytes of the seed subfield 86, the stream ID subfield 72, the sequence number subfield 70 and the timestamp subfield 66, the value is complemented and inserted least-significant bit first into the CRC subfield 98.

At the receiving instrument 14, in the performance of the decision made at step 96, a CRC value is computed using the byte values beginning with the presumed location of the seed subfield 86, and continues over the stream ID subfield 72, the sequence number subfield 70, the timestamp subfield 66 and the CRC subfield 98. If this computed CRC at the receiving instrument 14 is equal to the predetermined value of 0xF0B8, then the cyclic redundancy check at step 96 passes. It should be noted that if less than all of the seed subfield 86, the stream ID subfield 72, the sequence number subfield 70 and the timestamp subfield 66 are used to compute the CRC value in the CRC subfield 98, then the CRC value computed at the receiving instrument 14 would use only the lesser set of subfields in addition to the CRC subfield 98.

It is also to be noted that, if the byte values in any of the subfields of the signature field 38 are to be randomized as described above in reference to FIG. 4, such randomization is preferably performed at the transmitting instrument 12 prior to computation of the CRC using these byte values. Accordingly, the CRC computation at the receiving instrument 14, in accordance with step 92, would be performed on the byte values of the signature field 38 as received. In this regard, the comparing step 94 and the decision at step 96 would also performed prior to any randomized subfield of the signature field 38 being reconstructed at the receiving instrument 14.

Returning to the decision at step 96, if the YES path is taken a further check on the assumed location of the signature field 38 may also be performed. As indicated at step 100, the value in the presumed location of the seed subfield 86 is read and, as indicated at step 102, the complement of this value is compared to the byte value of the least significant byte 84 in presumed location of the sequence number subfield 70. A decision is made, as indicated at step 104 to determine if a match occurs, and if so the YES path is taken and the location of the signature field 38 is indicated as being ascertained, as indicated at 106. If there is not a match, the NO path is taken and the process returns to the assuming step 90.

It is to be noted that the first decision based the CRC value at step 96 and the second decision at step 104 based on the value in the presumed location of the seed subfield 86 and the presumed location of the least significant byte 84 at step 104 use some of the same byte values of the signature field 38. Accordingly, a false positive, that could occur when only comparing pairs of bytes or subfields, wherein one pair is a complement of the other, is mitigated.

It should be apparent to those skilled in the art that each of the steps in the methods described above may be implemented in any of software, hardware or firmware modules, or any combination thereof, within the transmitting instrument 12 or the receiving instrument 14, as the case may be in accordance with the present disclosure.

There have been described hereinabove novel methods and apparatus for placing a timestamp in a frame. Those skilled in the art may now make numerous uses of, and departures from, the hereinabove described embodiments without departing from the inventive concepts disclosed herein. Accordingly, the present invention is to be defined solely by the lawfully permitted scope of the appended claims.

What is claimed as the invention is:

1. A method of adding information to an encapsulated payload in a data field of a frame subsequently to placing a checksum into a checksum field of a header encapsulating said payload, wherein said checksum has been determined from byte values of said header and said payload, so that said checksum is detectable as valid upon interpretation of said header and said payload, said method comprising steps of:

inserting into said data field a signature field that contains said information, said signature field having a checksum cheater subfield; and placing a one's complement of a checksum determined from byte values of said information into said checksum cheater subfield, whereby said checksum in said checksum field of said header remains valid.

2. A method as set forth in claim 1 wherein said placing step includes the steps of:

reading said byte values of said information and calculating said checksum determined from said byte values of said information;

inverting said checksum determined from said byte values to obtain said one's complement; and writing said one's complement into said checksum cheater subfield.

3. A method as set forth in claim 1 wherein said inserting step is performed as a bit stream of said frame is emitted from a transmitting instrument.

4. A method as set forth in claim 3 wherein said inserting step is performed concurrently with calculation of a frame check sequence to be appended to said frame.

5. A method as set forth in claim 3 wherein said inserting step appends said signature field to said payload.

6. A method as set forth in claim 5 wherein said signature field is appended bit-wise to said payload as said signature field is emitted in said bit stream.

7. A method as set forth in claim 1 wherein said signature field includes a timestamp subfield, said information including timestamp information in said timestamp subfield obtained upon imminent emission of said frame.

8. A method as set forth in claim 1 wherein said signature field further includes a sequence number field, said information further including a sequence number of said frame in said sequence number field.

9. A method as set forth in claim 8 wherein said signature field further includes a stream ID subfield, said information further including a stream ID in said stream ID subfield.

10. A method of adding information to an encapsulated payload in a data field of a frame so that a checksum in a checksum field of a header encapsulating said payload is detectable as valid upon interpretation of said header and said payload, said method comprising steps of:

placing a randomly generated checksum in said checksum field during generation of said header;

inserting into said data field a signature field that contains said information, said signature field having a checksum cheater subfield; and placing a true checksum determined from byte values of said header inclusive of said checksum field, said payload and said information exclusive of said checksum cheater subfield into said checksum cheater subfield, whereby said randomly generated checksum in said checksum field of said header is detectable as valid.

11. A method as set forth in claim 10 wherein said true checksum placing step includes the steps of:

reading said byte values of said header inclusive of said checksum field, said payload and said information exclusive of said checksum cheater subfield said true checksum and concurrently calculating said true checksum therefrom; and writing said true checksum into said checksum cheater subfield.

12. A method as set forth in claim 11 wherein said reading and calculating step is performed as a bit stream of said frame is emitted from a transmitting instrument.

13. A method as set forth in claim 11 wherein said reading and calculating step is performed concurrently with calculation of a frame check sequence to be appended to said frame.

14. A method as set forth in claim 10 wherein said inserting step is performed as a bit stream of said frame is emitted from a transmitting instrument.

15. A method as set forth in claim 14 wherein said inserting step is performed concurrently with calculation of a frame check sequence to be appended to said frame.

16. A method as set forth in claim 14 wherein said inserting step appends said signature field to said payload.

17. A method as set forth in claim 16 wherein said signature field is appended bit-wise to said payload as said signature field is emitted in said bit stream.

18. A method as set forth in claim 10 wherein said signature field includes a timestamp subfield, said information including timestamp information in said timestamp subfield obtained upon imminent emission of said frame.

19. A method as set forth in claim 18 wherein said signature field further includes a sequence number field, said information further including a sequence number of said frame in said sequence number field.

20. A method as set forth in claim 19 wherein said signature field further includes a stream ID subfield, said information further including a stream ID in said stream ID subfield.

* * * * *